(No Model.)
J. M. SHOOK.
BRAKE BEAM.
No. 468,421. Patented Feb. 9, 1892.
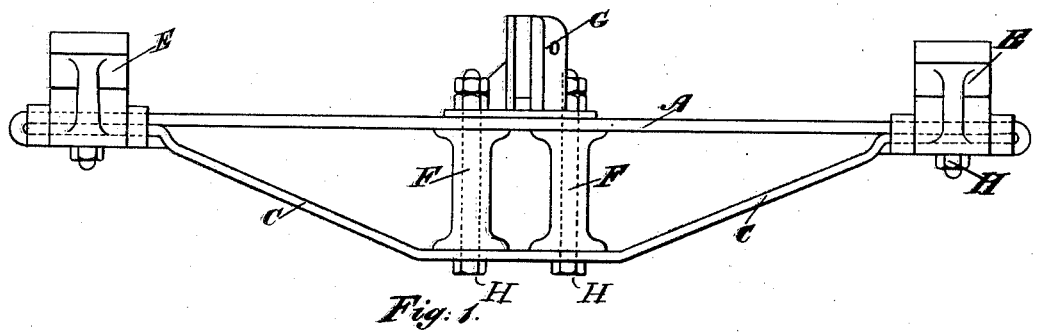
Fig. 1.
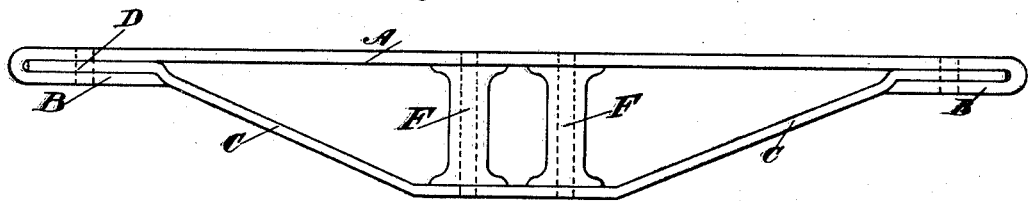
Fig. 2.
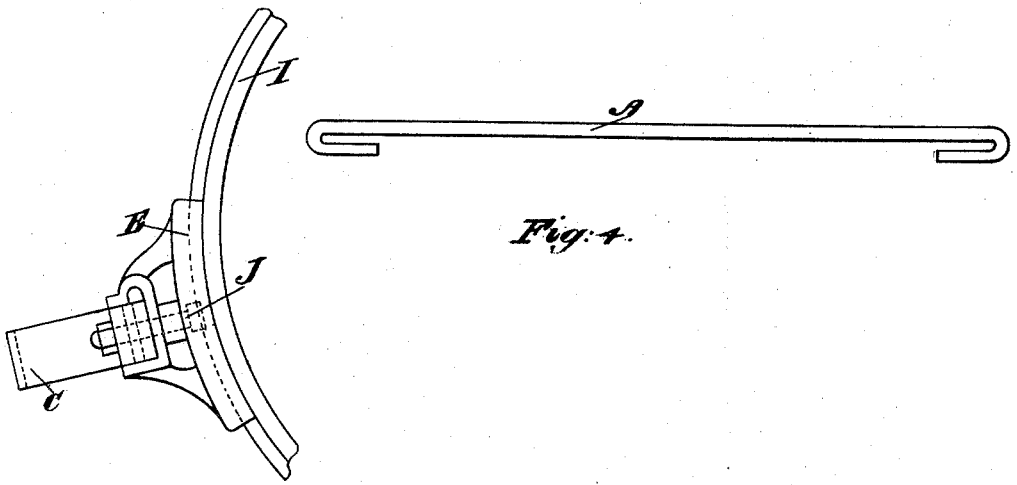
Fig. 3.
Fig. 4.
WITNESSES:
William Maddocks
W. H. Brehm
John M. Shook INVENTOR
BY
E. C. Ward
ATTORNEY.

UNITED STATES PATENT OFFICE.

JOHN M. SHOOK, OF PARSONS, KANSAS.

BRAKE-BEAM.

SPECIFICATION forming part of Letters Patent No. 468,421, dated February 9, 1892.

Application filed March 28, 1891. Serial No. 386,772. (No model.)

*To all whom it may concern:*

Be it known that I, JOHN M. SHOOK, a citizen of the United States, residing at the city of Parsons, in the county of Labette and State of Kansas, have invented a new and useful Railway Brake-Beam, of which the following is a description.

My invention relates to improvements in railway brake-beams in which the beam is stiffened and strengthened by a brace thereon as a part thereof.

Heretofore railway brake-beams have ordinarily been made without suitable braces, and they therefore would vibrate or spring when the pressure of the brakes was applied to the wheels of the car, and thus permit the wheels to revolve when the brakes were on, which would wear the brakes and would not hold the car.

The object of my invention is to overcome the objections aforesaid, and to make a cheap, simple, durable, and convenient brake-beam, so constructed that it can be easily put on and taken off, and which can be used with any kind of brake shoes or plates, and is so constructed that if it is sprung or bent in any accident on the road (as running off of a high embankment or through a bridge into a river) it can be straightened and again used, and either part of the beam and braces can be supplied or refilled with a new part. I attain these objects by the mechanism illustrated in the accompanying drawings, in which—

Figure 1 is a view of the brake-beam, braces, brake-shoe, fulcrum, and bolts. Fig. 2 is a view of the brake-beam and braces. Fig. 3 is a view of the end of braces of the brake-beam with a brake-shoe and a section of a car-wheel. Fig. 4 is a view of the plate or part of the brake-beam turned in at the ends to form loops to hold ends of braces.

Similar letters refer to similar parts throughout the several views.

A is the plate or part having its ends turned in to form the loops to hold braces.

B is the end of the plate as turned in to form the said loops. C is the brace, the ends of which are held in said loop B.

D is a bolt-hole at each end of the beam through the beam and brace for bolts to hold the brace and brake-shoe.

E is the brake-shoe, any brake-shoe being used.

F is the brace (or braces) to brace the fulcrum G, which is held as part of the brake-beam by bolts H H, passing through braces F F and nuts thereon.

J is a bolt to bolt the brake-shoe to the brake-beam, and I is a section of the rim or tire of the car-wheel.

In making the plate or beam, Fig. 4, I use a flat piece of steel or other material of proper thickness, width, and length, and turn or loop its ends, as illustrated in Fig. 4.

Any braces, bolts, and brake-shoes can be used.

What I claim as my invention, and desire to secure by Letters Patent, is—

In a brake-beam, the combination of plate A, brace C, bolts J J, fulcrum G, braces F, and bolts therethrough to retain the fulcrum, substantially as described.

JOHN M. SHOOK.

Witnesses:
W. A. DISCK.
J. D. SCOTT.